(12) United States Patent
Love et al.

(10) Patent No.: US 9,122,729 B2
(45) Date of Patent: Sep. 1, 2015

(54) CHAIN-OF-CUSTODY FOR ARCHIVED DATA

(75) Inventors: Joel Michael Love, Saxtons River, VT (US); Daniel Joseph Moore, Tucson, AZ (US); Elliot Lawrence Gould, Windham, NH (US); Laurence G. Walker, Boston, MA (US); Timothy Allen Wright, Northrop, MA (US)

(73) Assignee: Cumulus Data LLC, Tucson, AZ (US)

( * ) Notice: Subject to any disclaimer, the term of this patent is extended or adjusted under 35 U.S.C. 154(b) by 0 days.

(21) Appl. No.: 12/847,170

(22) Filed: Jul. 30, 2010

(65) Prior Publication Data

US 2011/0184910 A1 Jul. 28, 2011

Related U.S. Application Data

(60) Provisional application No. 61/230,471, filed on Jul. 31, 2009.

(51) Int. Cl.
*G06F 17/00* (2006.01)
*G06F 17/30* (2006.01)

(52) U.S. Cl.
CPC .... *G06F 17/30551* (2013.01); *G06F 17/30893* (2013.01)

(58) Field of Classification Search
CPC .................................................. G06F 17/30893
USPC .......................................... 707/687, 698, 802
See application file for complete search history.

(56) References Cited

U.S. PATENT DOCUMENTS

| | | | | |
|---|---|---|---|---|
| 6,292,569 B1 * | 9/2001 | Shear et al. | .................. | 380/255 |
| 7,162,635 B2 * | 1/2007 | Bisbee et al. | ................. | 713/176 |
| 7,281,133 B2 * | 10/2007 | Ginter et al. | .................. | 713/176 |
| 7,340,610 B1 * | 3/2008 | Yagawa | ........................ | 713/178 |
| 2003/0187873 A1 * | 10/2003 | Paffe et al. | ................. | 707/104.1 |
| 2004/0054676 A1 * | 3/2004 | McNally et al. | .............. | 707/100 |
| 2004/0128273 A1 * | 7/2004 | Amitay et al. | .................... | 707/1 |
| 2004/0220975 A1 * | 11/2004 | Carpentier et al. | ........... | 707/200 |
| 2006/0195914 A1 * | 8/2006 | Schwartz et al. | ............... | 726/32 |
| 2006/0271787 A1 * | 11/2006 | DeYoung et al. | ............. | 713/176 |
| 2008/0100874 A1 * | 5/2008 | Mayer | ........................... | 358/403 |
| 2008/0104408 A1 * | 5/2008 | Mayer | ........................... | 713/178 |
| 2008/0201580 A1 * | 8/2008 | Savitzky et al. | ............... | 713/189 |
| 2011/0231645 A1 * | 9/2011 | Thomas et al. | ................ | 713/150 |
| 2013/0132718 A1 * | 5/2013 | Agrawal | ........................ | 713/158 |

* cited by examiner

*Primary Examiner* — Eliyah S Harper
(74) *Attorney, Agent, or Firm* — Fish & Richardson P.C.

(57) ABSTRACT

A method that builds a chain-of-custody for archived data is disclosed to ensure the integrity and reliability of the archived data. In one implementation, by using a certified Time Stamp Authority (TSA), an indelible record of each time the archived data is touched (e.g. created, stored, retrieved, accessed, tested, moved, or transformed) is generated to build verifiable links between events to ensure the custody of the data can be audited and verified that it has remained intact throughout its lifetime. The chain-of-custody, in combination with the storage architecture that ensures archive data has not changed through various software and hardware means (e.g., multiple hash signatures to ensure integrity, timestamp authorities to pinpoint each time the archived data was touched, location information to pinpoint physical location, and coordinated chain of custody on multiple replicas of the digital artifact) validates that the archived data has not changed since it was archived.

18 Claims, 10 Drawing Sheets

CHAIN-OF-CUSTODY FOR ARCHIVED DATA

CROSS-REFERENCE TO RELATED APPLICATIONS

This application claims the benefit of the filing date of U.S. provisional application No. 61/230,471, filed on 31 Jul. 2009, which is included herein by reference in its entirety.

BACKGROUND OF THE INVENTION

1. Field of the Invention

This disclosure relates generally to the field of data storage and archiving and, in some embodiments, more specifically to establishing a reliable record of the chain of events and tracking of location and transfer (physical and/or virtual) of data objects for auditing custody of the same during the activities used to create, store, test, and/or retrieve archived data.

2. Description of the Related Art

Determining whether electronic data is "good" (original) or "bad" (manipulated) is demanding. Without mechanisms in place, the electronic data itself and the times associated with any changes to the data can be modified and manipulated, often without detection, creating challenges to establishing the reliability of the electronic data.

Currently there are two classes of electronic data certifications: certified Time Stamp Authorities, and non-repudiation services.

A Time Stamp Authority (TSA) issues a timestamp to prove the existence of certain data before a certain point in time without the possibility that the owner can backdate the timestamps. TSAs are used to timestamp on-line bills and orders (to prove when a transaction has occurred and that their contents have not been altered since then), creative works (the person with the earliest timestamp provides strong evidence in claiming ownership of a text, graphic, audio, and video work), or digital signatures (an accurate time from a trustworthy third party shows when a digital document was signed assigning the property of non-repudiation to the document). Non-repudiation services minimally build on the concept of a TSA to provide document time stamping. Their focus is generally on the legal concerns around electronic document non-repudiation. Exemplary TSA providers include ProofSpace, Inc. of Grand Rapids, Mich., and Formatta, Inc. of Fairfax, Va.

Due to increasing governance regulations, such as Sarbanes-Oxley, and the amplified value of Intellectual Property, such as patents or copyrighted material, it is desirable that a homogeneous, comprehensive set of records be used to ensure the integrity and reliability of archived data. More specifically, it can be desirable to have an indelible record of each time the archived data is touched (e.g. created, stored, retrieved, accessed, tested, moved, or transformed) to generate verifiable links between events in order to ensure the custody of the data can be audited and verified that it has remained intact throughout its lifetime, and to be able to detect any modification to the archived data, so that a proper copy can be retrieved to bring the archive copy back to its original state.

TSAs and non-repudiation services only provide a fragment of the functionality required to meet these types of needs for archived data.

SUMMARY

The presently disclosed technology overcomes the above-described limitations with timestamp authorities and non-repudiation services by defining a series of methods that create a reliable chain-of-custody for archived data.

In one embodiment of the invention, a machine-readable medium, having encoded thereon program code, wherein, when the program code is executed by a machine, the machine implements the steps of creating a chain-of-custody link for archived data. The method for creating the chain-of-custody link comprises creating a structure containing the link type, hash of the archived data for the link, and a hash of the archive metadata for the link. A hash of the structure is created and the hash is sent to a Time Stamp Authority (TSA). A certificate is received from the TSA and the Time Stamp certificate is appended to the archived data.

In an alternative embodiment of the invention, a machine-readable medium, having encoded thereon program code, wherein, when the program code is executed by a machine, the machine implements the steps of validating an Archive Chain for archived data. The method of validating an Archive Chain comprises examining a last link of the chain, comparing a previous hash to the entry in a previous link, comparing a Time Stamp of the previous link to ensure it is in descending order, and appending the link types, the metadata, and the Time Stamp to a report.

In still another embodiment of the invention, a method retrieving an archive, the method of retrieving an archive comprises the steps of initiating a retrieval request, generating a hash of an initial or replicated copy of archived data, appending the hash from a previous link in a chain, sending the hash to a Time Stamp Authority (TSA), receiving a certificate from the TSA, creating a link of type "retrieval" with a TSA Time Stamp token, appending the Time Stamp token and the "retrieval" link to the chain, appending a metadata describing a requester to the chain, appending request parameters to the chain, and appending the hash of actual archived data to the chain.

BRIEF DESCRIPTIONS OF THE DRAWINGS

The aspects, features, and advantages of the present invention will become more fully apparent from the following detailed description, the appended claims, and the accompanying drawings in which like reference numerals identify similar or identical elements.

DETAILED DESCRIPTIONS

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

A chain, also referred to herein as a custody chain, is a log of all the physical events in the life of an archived data set. The chain is a metadata construct about the archived data that is stored in the same physical container, folder, or volume (e.g., disk drive) with the corresponding archived data. The chain comprises of log entries (links) that contain information about each physical event as well as information tying each log entry to the previous entry and information that can be used to validate the integrity of the chain log entry at or to that point in time and/or place.

One core process in the presently disclosed embodiment can build links for a chain from various certificates authenticating the integrity of data, such as from a Time Stamp Authority (TSA), such as that provided by one of the above-mentioned companies. In this implementation, a Strong Link is constructed using an externally certified TSA, and is a way to construct a strong chain. Using Strong Links costs time and money because it involves going outside of the server, buying a certified time stamp, and waiting for the return. Time and money can be saved by producing links locally (e.g., creating a time-stamp without using an external TSA), referred to herein as a Weak Link, to create a weak chain, but such a chain may be unreliable as either a time certificate or a content certificate. However, a Weak Link can serve as an internal indicator of integrity of the chain, and, hence the chain-of-custody. A hybrid chain uses Weak and Strong links to provide some of the certainty of a strong chain, and the lower cost of a weak chain. A hybrid chain may be constructed with a Strong Link at the head of the chain, and occasional Strong Links down the chain at important events, interspersed with Weak Links at intermediate, less significant, events. A chain-of-custody may comprise strong, weak, or hybrid chains.

An Archive Chain comprises the archived data, additional information about the archived data (i.e., content metadata), and a chain, such as a hybrid chain constructed from Strong Links and Weak Links generated when the data archive is created, replicated, automatically verified, manually verified, and/or retrieved. The Archive Chain may, optionally, contain policy metadata and policy engines that enforce operations (like digital rights management or DRM, and decoding, formatting, etc.), and information about such things as the integrity of the original archived data or how the archived data can be accessed, used, stored, destroyed, etc.

Full or partial validation of the archived data may be requested. A data integrity validation merely involves comparing a current hash of the archive to the original hash. Access validations can report on the integrity of the archive from the beginning to any particular moment in time, and identify significant events, such as retrieval of the archived data by a given party. Each of these validation results may include a time stamp that is as guaranteed as the TSA is.

Chain-of-Custody Link Creation

Figure 1:
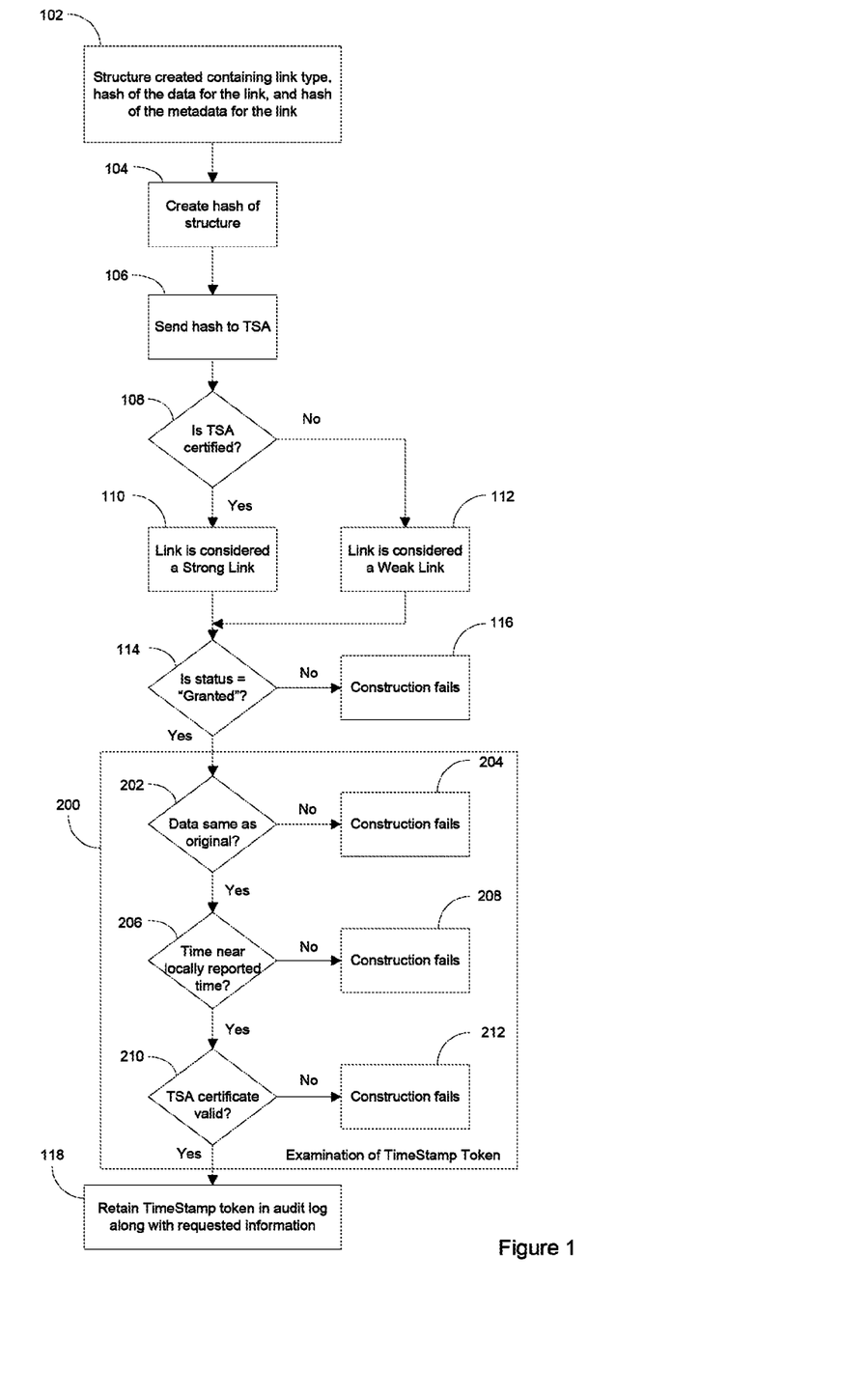
FIG. 1 is a logical flow diagram illustrating the chain-of-custody link creation flow.

FIG. 1 is a logical flow diagram illustrating a chain-of-custody link creation flow. In step 102 a structure is created containing the link type, a hash of the data for the link, and a hash of any metadata for this type of link. Following step 102, step 104 creates a new hash of the entire structure created in step 102. Step 104 is followed by step 106 where the hash is sent in a request to a Time Stamp Authority (TSA). The TSA returns a time stamp response that contains a status, and a Time Stamp Token containing signed data, which is the certificate. If the TSA is certified, then the resultant link is considered a Strong Link (step 110), otherwise the link is considered a Weak Link (step 112). If the time stamp response status is anything other than "granted," then the link construction fails (step 116). If the status is "granted," then the Time Stamp Token is examined (step 200) to ensure that the data is the same as the original (step 202), that the time reported is near the locally obtained time (step 206), and that the TSA's certificate is valid (step 210). If any of these conditions is not true, then the construction of the link fails (steps 204, 208 or 212). If the Time Stamp Token is deemed valid, it is retained in an audit log along with the requested information (step 118).

Archive Chain Construction

Figure 2:
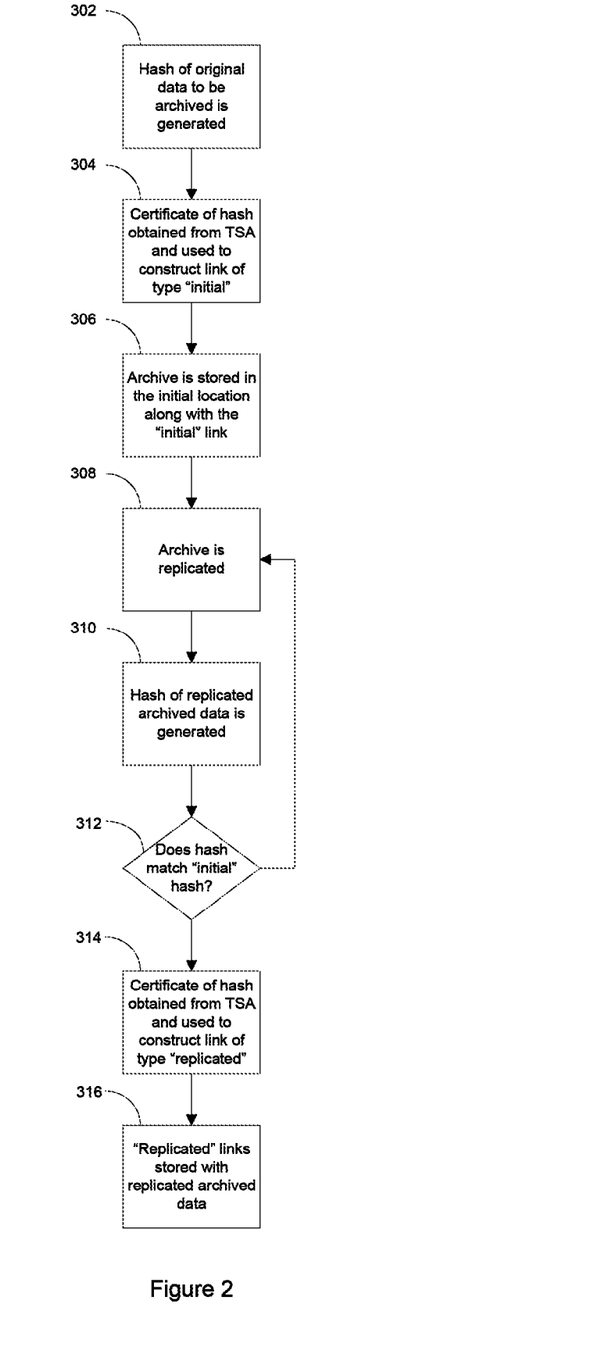
FIG. 2 is a logical flow diagram illustrating the construction of the Archive Chain.

FIG. 2 is a logical flow diagram illustrating the construction of the Archive Chain. The links created by the flow diagramed in FIG. 1 are used for constructing the Archive Chain. In step 302, a hash is generated of the original data destined for archive. Step 302 is followed by step 304 where a certificate is obtained from the TSA to construct a link of type "initial" as outlined in FIG. 1. The resulting token is carried along with the archive in its transaction log (step 306). Next in step 308 the archived data is replicated. Following step 308, step 310 generates a hash of the replicated archived data. The hash in each replica is compared with the original hash (step 312). If all hash values are the same, a link of type "replicated" is obtained from the TSA (step 314) and the token is stored in the associated transaction log (step 316).

Automatic Archive Validation Chain Construction

Figure 3:
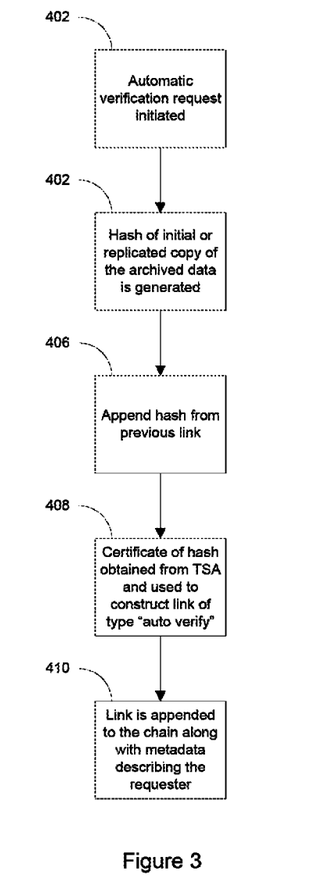
FIG. 3 is a logical flow diagram illustrating the construction of the automatic archive verification part of the Archive Chain.

FIG. 3 is a logical flow diagram illustrating the construction of the automatic archive verification part of the Archive Chain. An "automatic archive validation request" is a validation request initiated as part of the normal system flow (e.g., drive test, retrieval, migration to new technology, drive repair on failure). The automatic archive validation request becomes a part of the Archive Chain.

In step 402, an automatic verification request on the archived data is initiated by, for example, a user or an event such as a monthly archived data integrity test. Following step 402, step 404 generates a hash of the initial or replicated archived data. Following step 404, step 406 appends the hash from the previous link and next, in step 408, where a certificate is obtained from the TSA to construct a link of type "auto verify". Finally, in step 410, this link is appended to the chain.

Manual Archive Validation Chain Construction

Figure 4:
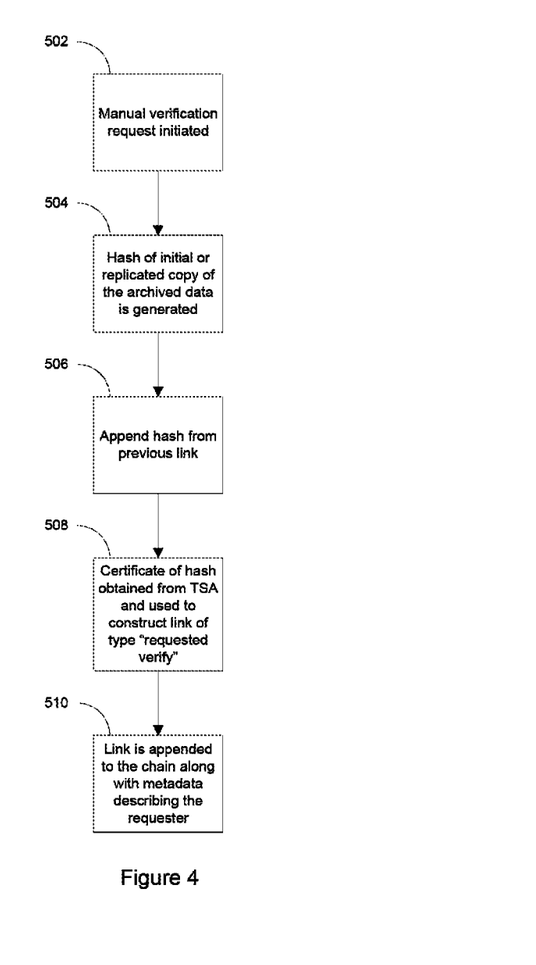
FIG. 4 is a logical flow diagram illustrating the construction of the manual archive verification part of the Archive Chain.

FIG. 4 is a logical flow diagram illustrating the construction of the manual archive verification part of the Archive Chain. A "manual archive validation request" is a validation request initiated external to the normal system flow—for instance, when a user requests validation of the archive. It can occur at any time, and is not part of the system flow for internal testing, retrieval, migration, etc. Note that a manual archive validation request, since it touches the archived data, causes the generation of a chain-of-custody event (a validation request) that becomes part of the Archive Chain.

In step 502, a manual verification request is initiated on the archived data. Following step 502, step 504 generates a hash of the initial or replicated archived data. Following step 504, step 506 appends the hash from the previous link and next, in step 508, where a certificate is obtained from the TSA to construct a link of type "requested verify." Finally, in step 510, this link is appended to the chain.

Archive Retrieval Chain Construction

Figure 5:
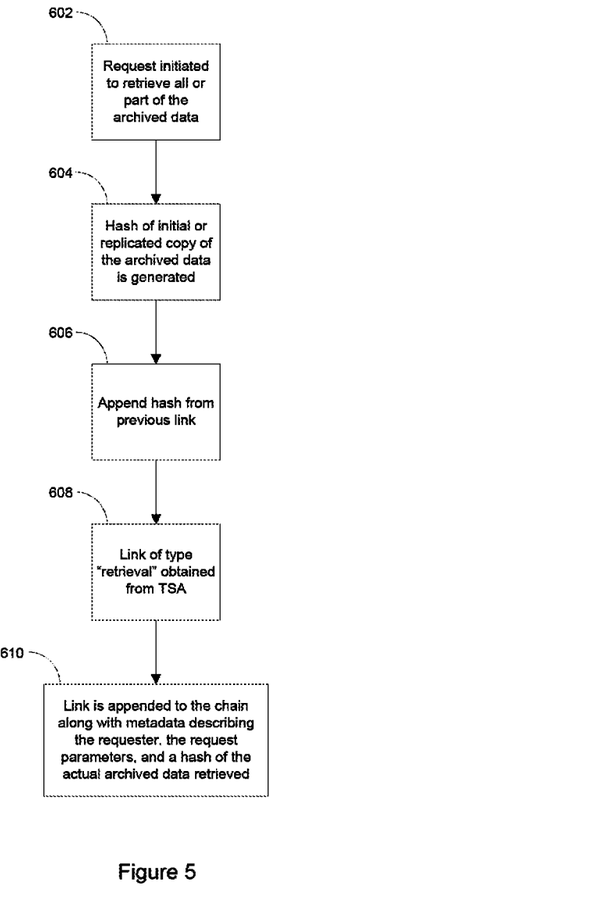
FIG. 5 is a logical flow diagram illustrating the construction of the archive retrieval part of the Archive Chain.

FIG. 5 is a logical flow diagram illustrating the construction of the archive retrieval part of the Archive Chain. In step 602, a request is initiated to retrieve all or part of the archived data. Following step 602, step 604 generates a hash of the initial or replicated archived data. Following step 604, step 606 appends the hash from the previous link and next, in step 608, where a certificate is obtained from the TSA to construct a link of type "retrieval." Finally, in step 610, this link is appended to the chain along with metadata describing the requester, the request parameters, and a hash of the actual archived data retrieved.

Chain Validation

Figure 6:
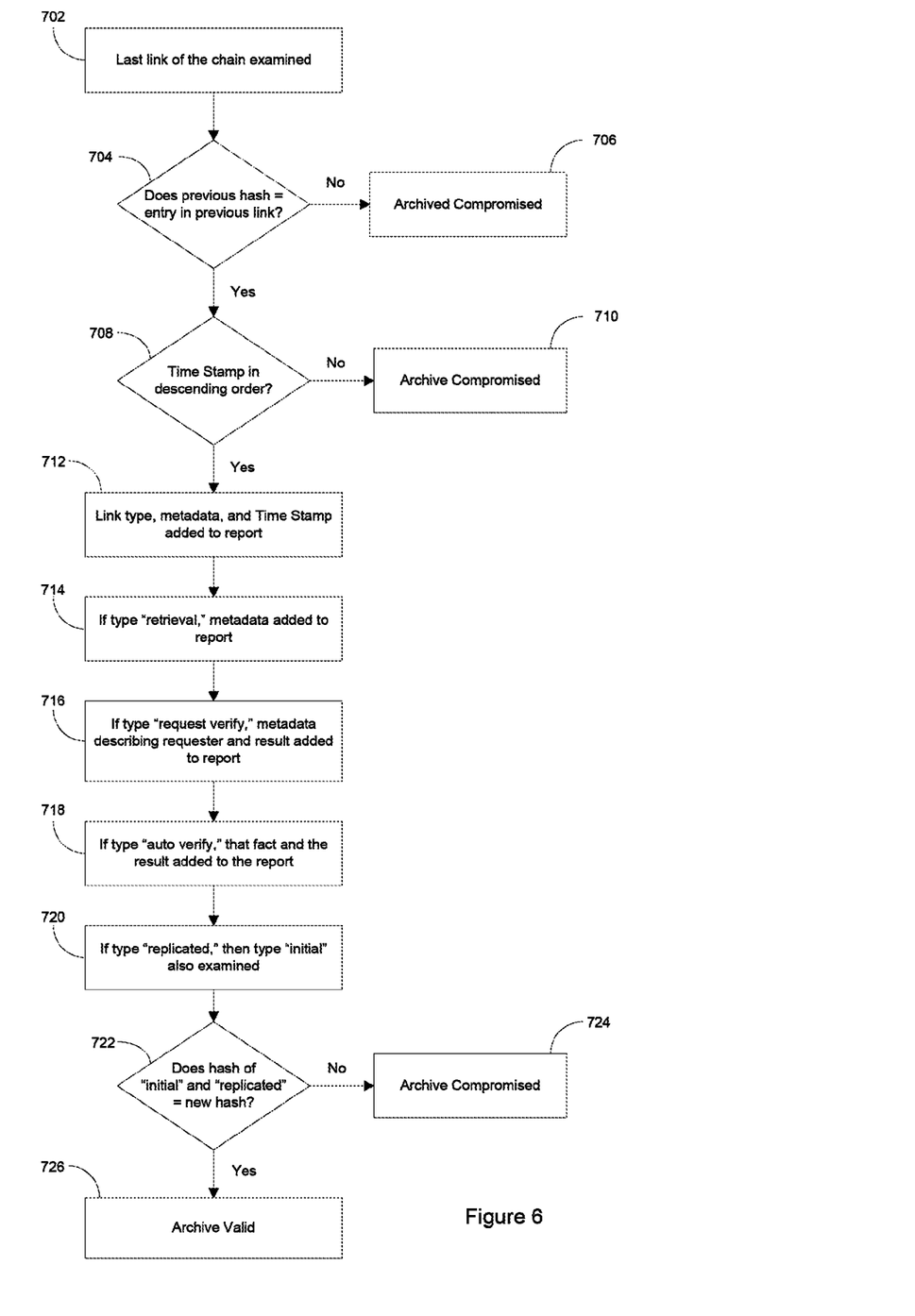
FIG. 6 is a logical flow diagram illustrating validation of the Archive Chain.

FIG. 6 is a logical flow diagram illustrating validation of the Archive Chain. The chain is examined backward from the last link to the first. Thus, in step 702 the last link of chain is examined by determining whether the value of the previous hash is equal to the entry in the previous link (step 704). If this comparison fails, then the archived data is described as compromised. If the comparison in step 704 succeeds, then the time stamps are compared to ensure they are in descending order (step 708). If this is not true, then the archive is considered compromised. If this test succeeds, then the link types, metadata, and time stamp are appended to the validation report (step 712). If the link is of type "retrieval," then the metadata is added to the report (step 714). If the link is of type "requested verify," then the metadata describing the requestor and the result is appended to the report (step 716). If the link is of type "auto verify," then that fact is appended to the report (step 718). If the link is of type "replicated," then the link for type "initial" is also examined (step 720). If the hash value of the "replicated" and "initial" links equals each other and the value of the newly calculated hash, then the archive is described as valid (step 726), otherwise it is described as compromised (step 724).

Hardware Chain-of-Custody Construction

Figure 7A:
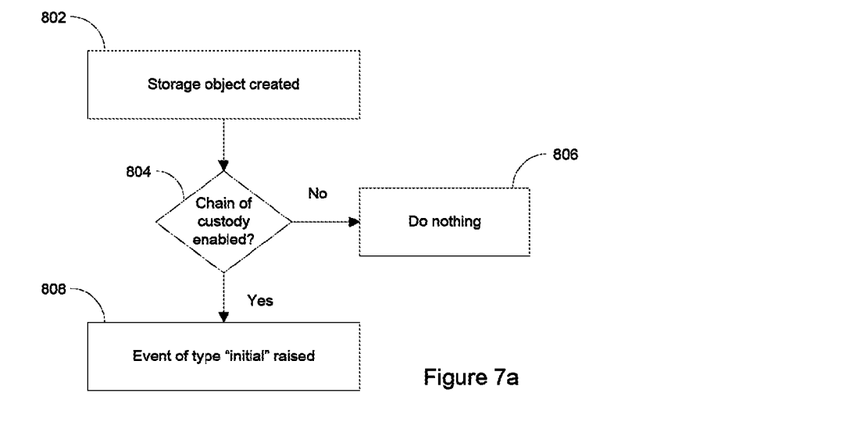
FIG. 7 is a logical flow diagram illustrating the chain-of-custody in hardware.
Figure 7B:
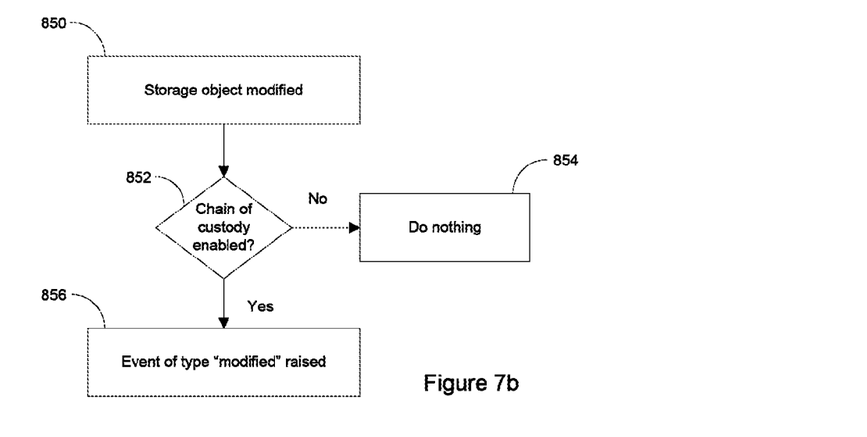
Figure 7C:
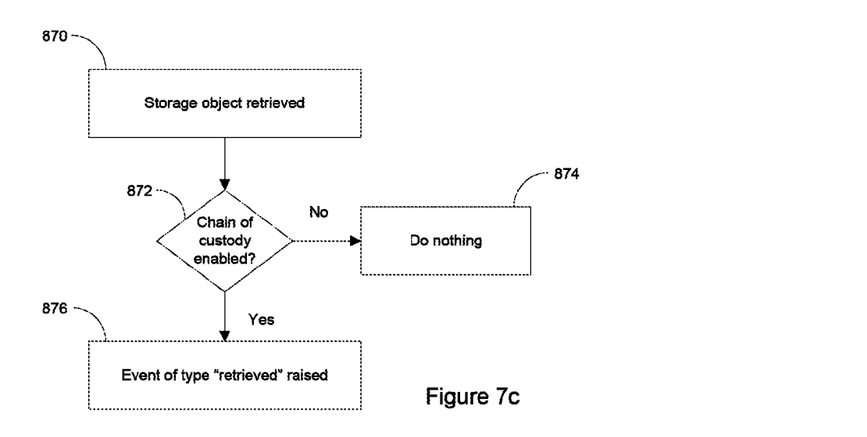

FIG. 7 is a logical flow diagram illustrating the construction of the Archive Chain in hardware when an object is created (FIG. 7a), modified (FIG. 7b), or retrieved (FIG. 7c). In addition to the standard control and data channels that exist in a hardware storage system, an audit channel is created and available. Stored objects can be tagged as "chain-of-custody"-enabled. In step 802 a storage object is created. Following step 802 is step 804 where the object is tested to see if it is "chain-of-custody"-enabled. If true, then step 808 raises an event of type "initial" such that the audit channel will send a message to the link building modules as described in FIG. 1. Similarly, in step 850 a storage object is modified. If "chain-of-custody" is enabled, then step 856 raises an event of type "modified" such that the audit channel will send a message to the link building modules as described above in connection with FIG. 1. Similarly, in step 870 a storage object is retrieved. If "chain-of-custody" is enabled, then step 876 raises an event of type "retrieved" such that the audit channel will send a message to the link building modules as described above in connection with FIG. 1.

Figure 8:
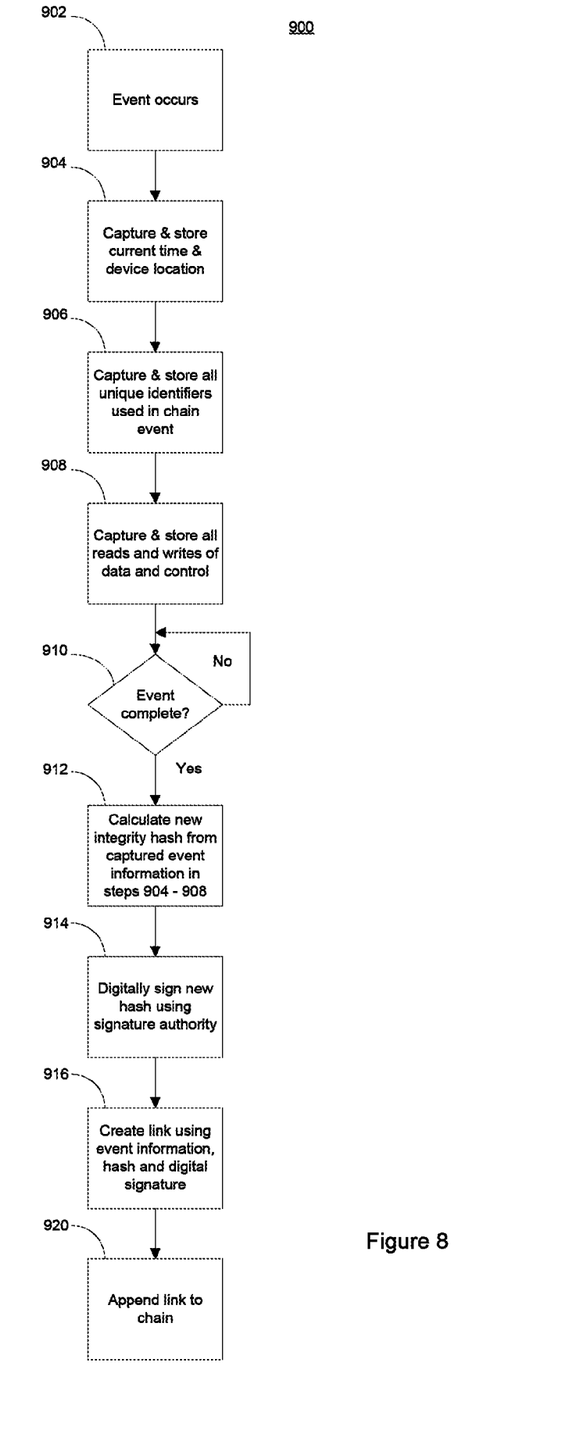
FIG. 8 is a logical flow diagram illustrating the construction of a link for an Archival Chain.

FIG. 8 is a logical flow diagram illustrating a hardware event initiated an Archive Chain link creation. In step 902, an event in hardware occurs that is to be part of the chain-of-custody. In step 904 a data structure is created that stores the current time from a time-server (e.g., a system clock) and the physical location of the device processing the event, which is stored in the hardware. In step 906, all the unique hardware identifiers that are part of the hardware event are captured and stored in the data structure. In step 908, the system information comprising the event (e.g., reads, writes, and data) in the hardware is captured and stored in the structure. Step 910 is a wait step for the event to finish. If the event is complete, then (step 912) a new integrity hash is calculated from all the information captured in steps 904-908. In step 914 the new integrity hash (and optionally the information in the structure) is used to create a signature hash using a signature authority, e.g., a TSA. In step 916 the signature, integrity hash, and the structure containing the event information are used to create the link. Finally, in step 920, the event link is appended to the chain.

Figure 9:
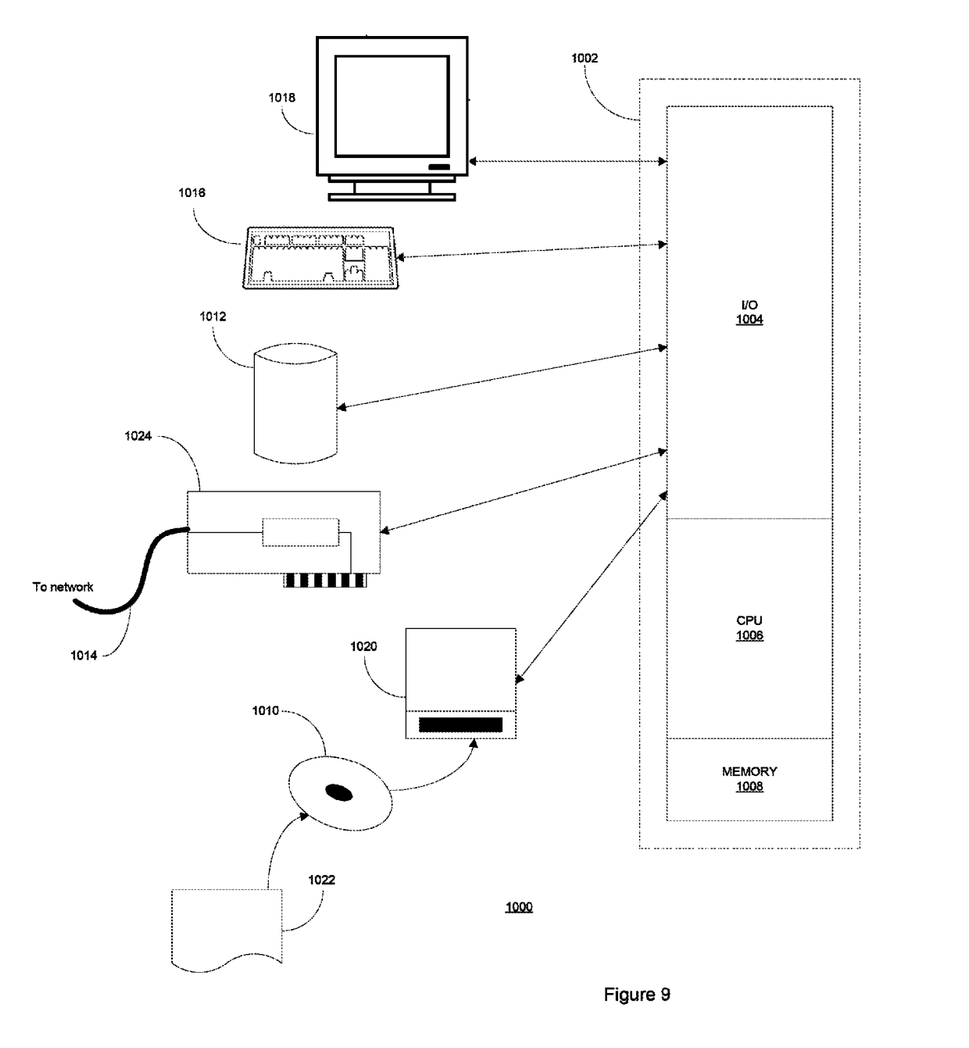
FIG. 9 illustrates an exemplary computing system that can be used to implement the present invention.

FIG. 9 illustrates an example computing system that can be used to implement the described technology. A general-purpose computer system 1000 is capable of executing a computer program product to execute a computer process. Data and program files may be input to the computer system 900, which reads the files and executes the programs therein. Some of the elements of a general-purpose computer system 1000 are shown in FIG. 9 wherein a processor 1002 is shown having an input/output (I/O) section 1004, a Central Processing Unit (CPU) 1006, and a memory section 1008. There may be one or more processors 1002, such that the processor 1002 of the computer system 1000 comprises a single central-processing unit 1006, or a plurality of processing units, commonly referred to as a parallel processing environment. The computer system 1000 may be a conventional computer, a distributed computer, or any other type of computer. The described technology is optionally implemented in software devices loaded in memory 1008, stored on a configured DVD/CD-ROM 1010 or storage unit 1012, and/or communicated via a wired or wireless network link 1014 on a carrier signal, thereby transforming the computer system 1000 in FIG. 9 to a special purpose machine for implementing the described operations.

The I/O section 1004 is connected to one or more user-interface devices (e.g., a keyboard 1016 and a display unit 1018), a disk storage unit 1012, and a disk drive unit 1020. Generally, in contemporary systems, the disk drive unit 1020 is a DVD/CD-ROM drive unit capable of reading the DVD/CD-ROM medium 1010, which typically contains programs and data 1022. Computer program products containing mechanisms to effectuate the systems and methods in accordance with the described technology may reside in the memory section 1004, on a disk storage unit 1012, or on the DVD/CD-ROM medium 1010 of such a system 1000. Alternatively, a disk drive unit 1020 may be replaced or supplemented by a floppy drive unit, a tape drive unit, or other storage medium drive unit. The network adapter 1024 is capable of connecting the computer system to a network via the network link 1014, through which the computer system can receive instructions and data embodied in a carrier wave. Examples of such systems include Intel and PowerPC systems offered by Apple Computer, Inc., personal computers offered by Dell Corporation and by other manufacturers of Intel-compatible personal computers, AMD-based computing systems and other systems running a Windows-based, UNIX-based, or other operating system. It should be understood that computing systems may also embody devices such as Personal Digital Assistants (PDAs), mobile phones, gaming consoles, set top boxes, Storage Area Network (SAN) systems, Network Area Storage systems, etc.

When used in a LAN-networking environment, the computer system 1000 is connected (by wired connection or wirelessly) to a local network through the network interface or adapter 1024, which is one type of communications device. When used in a WAN-networking environment, the computer system 1000 typically includes a modem, a network adapter, or any other type of communications device for establishing communications over the wide area network. In a networked environment, program modules depicted relative to the computer system 1000 or portions thereof, may be stored in a remote memory storage device. It is appreciated that the network connections shown are exemplary and other means of and communications devices for establishing a communications link between the computers may be used.

In an example implementation, a chain-of-custody link creation module, an Archive Chain construction module, an automatic archive validation chain construction module, a manual archive validation chain construction module, an archive retrieval chain construction module, a chain validation module, as described above in connection with FIGS. 1-8, respectively, and/or a hardware chain-of-custody module, may be incorporated as a computer program product (e.g., part of the operating system, application programs, or other program modules, including firmware), or as a hardware module (e.g., a disk drive controller, processor, etc.). A database or data structure containing a data archive as discussed above may be stored as data 1022 in the disk storage unit 1012 or other storage systems, such as the memory 1008 or the DVD/CD-ROM medium 1010.

In addition to the links described above, a globally unique identifier (GUID) can be generated for all processors, disk drives, hardware or software modules, and any other physical, code, data structure, or virtual component in the system. In one implementation, a GUID can be defined as a 128-bit integer (16 bytes) serial number that can be used across all computers and networks that has a very low probability of being duplicated, but the GUID can be extended to a more general universal ID market. As will be described in more detail below in relation to FIGS. 10 and 11, when the archived data passes through each system component, software or hardware associated with the component appends the GUID information about the operation being performed and a digital signature authenticating the operation and operators and components involved to the Archive Chain. This not only provides a record of precisely where the archived data has been for audit purposes, but also provides the ability to ensure the integrity of the archived data stored on different system components to protect the data from exposure to a systemic manufacturer's failure mechanism, e.g., disk drive failures. For example, an archive retrieval chain link could include the following information:

1. The content of the Archive Chain
2. The GUID for the volume on which the Archive Chain resides.
3. GUID for the RAID (Redundant Array of Independent Disks) set on which the volume resides.
4. GUID for drives in the RAID set.
5. GUID for the SATA controller that the Archive Chain data passes through.
6. Version of the software running on the system.

Figure 10:
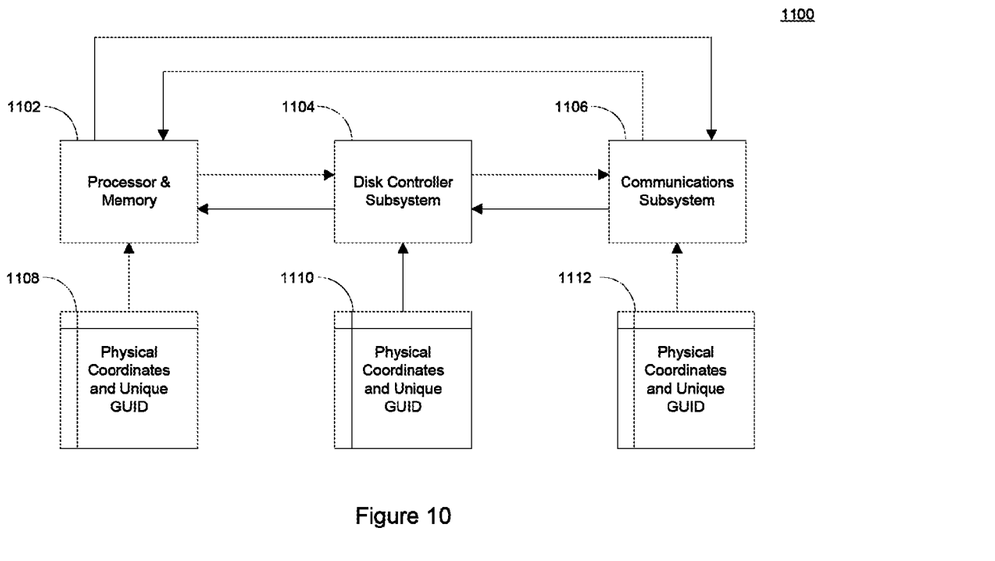
FIG. 10 is an exemplary block diagram of another example of a computing system that can be used to implement the present invention.

FIG. 10 is block diagram of a representative system 1100 that can implement the Archive Chain as described above. A representative processor and memory system 1102, as part of the archive chain information gathering, obtains a unique GUID stored in, for example, a read-only memory 1108 associated with the processor 1102. The creation of the Archive Chain also includes optionally obtaining physical coordinate information for processor 1102. Processor 1102 communicates on a regular basis during normal operation with a representative Digital Storage Subsystem 1104, such as a Disk Controller Subsystem, and a Communications Subsystem 1106. Subsystems 1104 and 1106 can also optionally communicate with each other independently of the processor 1102. Each subsystem obtains a unique GUID for itself from an associated read-only memory 1110, 1112 that also contain optional physical coordinates of each subsystem. The GUID and physical coordinate information is used by the processes described in FIGS. 1 and 9 to create an Archive Chain link for an event.

Figure 11:
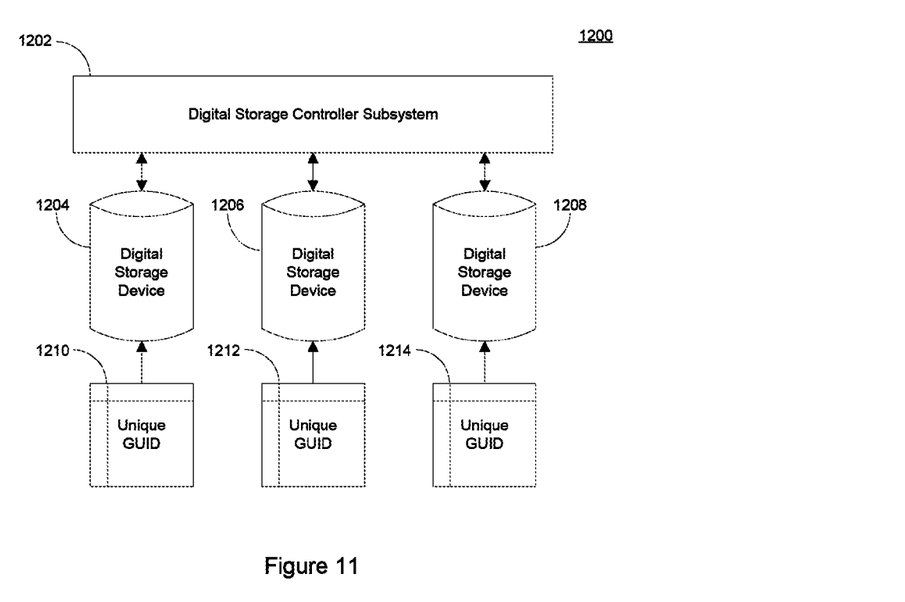
FIG. 11 is an exemplary block diagram illustrating details of an exemplary storage subsystem in FIG. 10.

FIG. 11 is a block diagram of a representative Disk Controller Subsystem 1104 of FIG. 10, here comprising a Digital Storage Controller Subsystem 1202 and associated storage devices 1204-1208. Subsystem 1202 controls a group of one or more individual Digital Storage Devices 1204, 1206, and 1208, each of which, when requested, reads unique GUIDs from associated read-only memories 1210, 1212, and 1214, respectively, and communicates that information to subsystem 1202 as part of an Archive Chain creation event. In this embodiment, storage devices 1204, 1206, and 1208 are physically near or in subsystem 1202, so that physical coordinates for each of the Digital Storage Devices is not required. In another embodiment, storage devices 1204, 1206, and 1208 are physically remote from subsystem 1202, and physical coordinates thereof could be part of the information communicated along with the unique GUID.

Extension of the Technology to Other Tiers of Storage

The techniques described above can be applied to higher tiers of storage (e.g. so-called "Tier1" or "Tier2" storage) in the same way that they are applied to archived storage. Stored objects (e.g., files, blocks, physical sectors, volumes, RAID groups, etc.) can be tagged as chain-enabled. Storage software checks for this tag whenever a data storage, movement, transform, or retrieval event occurs. If the object is tagged, a message is sent to the link and chain modules. A storage system could obtain a higher level of integrity by building the custody chaining functions into hardware versus using the software layer. Processing units can be built to initiate and guarantee custody chaining at the hardware level. Memory objects can be tagged as chain-enabled and the process described above can initiate messages to construct links and chains. System components, like disk drives, can have chain-of-custody firmware and/or hardware added to them or can be built with the chain-of-custody functionality in hardware.

Virtualization Chain-of-Custody

Virtual data storage and manipulation systems can provide information for building custody chains as data is stored, moved, modified, and retrieved in virtual storage systems. Virtual storage systems are a class of storage systems that map the referencing system's (like a server or workstation) address (e.g., like mapping a network drive and folder in windows to a drive letter) to a physical location. That location can easily have little or no physical association with the other files in the same directory. Virtualized storage systems move files around to different storage tiers (physical kinds of storage that could be segregated based on performance and reliability, for example) transparently to the user of the file.

In one implementation, the front-end system stores locally the audit log of links describing what transpired in the virtual storage system. During setup and configuration of the virtual system defining how physical storage objects will be handled by the virtual system, it is specified that a storage object can be tagged as chain-enabled, and that access events will be reported back to the front-end system. These reports contain system identification, metadata, value hash, and event type information. The front-end system builds links containing this information and appends them to the chain.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the terms "implementation" and "example."

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Having described the preferred embodiment of this invention, it will now be apparent to one of skill in the art that other embodiments incorporating its concept may be used. Therefore, this invention should not be limited to the disclosed embodiment, but rather should be limited only by the spirit and scope of the appended claims.

What is claimed is:

1. A non-transitory machine-readable medium, having encoded thereon program code, wherein, when the program code is executed by a machine, the machine creates a chain-of-custody entry for an archived data set, the method by performing operations comprising:
    creating a structure containing an entry type, a first hash of the archived data set, and a second hash of archive metadata;
    creating a third hash of the structure;
    sending the third hash to a third-party Time Stamp Authority (TSA);
    receiving information from the third-party TSA, the received information including the third hash, a time stamp, and a certificate certifying that the third-party TSA is certified;
    determining (a) whether the received time stamp matches a maintained local time, (b) whether the received third hash is identical to the third hash sent to the third-party TSA, and (c) whether the received certificate is valid; and
    if (a) the received time stamp is determined to match the maintained local time, and (b) the received third hash is determined to be identical to the third hash sent to the third-party TSA, and (c) the received certificate is determined to be valid, then creating a chain-of-custody entry by appending at least the received certificate to the archived data set, wherein the chain-of custody entry defines an event relating to the archived data set.

2. The machine-readable medium of claim 1 wherein the chain-of-custody entry is considered a Strong entry if the TSA is certified, otherwise the chain-of-custody entry is considered a Weak entry.

3. The machine-readable medium of claim 1 wherein the chain-of-custody entry construction fails if a status received from the TSA is not "Granted".

4. The machine-readable medium of claim 1 wherein the chain-of-custody entry construction fails if the third hash returned from the TSA is not the same as the third hash sent to the TSA.

5. The machine-readable medium of claim 1 wherein the chain-of-custody entry construction fails if the time stamp received from the TSA is not sufficiently near the locally reported time.

6. The machine-readable medium of claim 1 wherein the chain-of-custody entry construction fails if the received certificate is not valid.

7. The machine-readable medium of claim 1 wherein the chain-of-custody entry is constructed in hardware by performing operations comprising: creating a storage object; raising an event of type "initial" if "chain-of-custody" is enabled; and sending a message from an event manager to one or more entry building modules.

8. The machine-readable medium of claim 1 wherein the entry is constructed in hardware by performing operations comprising: modifying a storage object; raising an event of type "modified" if "chain-of-custody" is enabled; and sending a message from an event manager to one or more entry building modules.

9. The machine-readable medium of claim 1 wherein the entry is constructed in hardware by performing operations comprising: retrieving a storage object; raising an event of type "retrieved" if "chain-of-custody" is enabled; and sending a message from an event manager to one or more entry building modules.

10. A non-transitory machine-readable medium, having encoded thereon program code, wherein, when the program code is executed by a machine, the machine creates an archive chain for an archived data set by performing operations comprising:
    generating a hash of an initial archived data set;
    sending the generated hash of the initial archived data set to a third-party Time Stamp Authority (TSA);
    receiving first information from the third-party TSA, the received first information including the generated hash, a time stamp, and a certificate certifying that the third-party TSA is certified;
    determining (a) whether the received time stamp matches a maintained local time, (b) whether the received hash is identical to the generated hash sent to the third-party TSA, and (c) whether the received certificate is valid; and
    if (a) the received time stamp is determined to match the maintained local time, and (b) the received hash is determined to be identical to the generated hash sent to the third-party TSA, and (c) the received certificate is determined to be valid, then creating an archive chain entry of type "initial" with at least a portion of the information received from the third-party TSA;
    appending the first Time Stamp token and the "initial" archive chain entry to the initial archived data set;
    replicating the initial archived data set to generate a replicated archived data set; generating a hash of the replicated archived data set;
    sending the hash of the replicated archived data set to the third-party TSA;
    receiving second information from the TSA;
    creating a an archive chain entry of type "replicated" with at least a portion of the received second information; and appending at least a portion of the second information and the "initial" archive chain entry to the replicated archived data set.

11. The machine-readable medium of claim 10 wherein the archive chain entry is configured for an automatic verification of the archived data set, and wherein the operations further comprise:
   initiating an automatic verification request;
   generating a hash of the initial or replicated copy of the archived data set;
   appending the hash from the previous entry in the archive chain;
   sending the hash to the TSA;
   receiving a certificate from the TSA, the certificate including a TSA Time Stamp token; and
   creating an archive chain entry of type "auto verify" with the TSA Time Stamp token;
   appending the Time Stamp token and the "auto verify" entry to the archive chain.

12. The machine-readable medium of claim 10 wherein the archive chain entry is configured for a manual verification of the archived data set by performing operations comprising:
   initiating a manual verification request;
   generating a hash of the initial or replicated copy of the archived data set;
   appending the hash from the previous entry in the archive chain;
   sending the hash to the TSA;
   receiving a certificate from the TSA, the certificate including a TSA Time Stamp token; creating an archive chain entry of type "requested verify" with the TSA Time Stamp token; and appending the Time Stamp token and the "requested verify" entry to the archive chain; appending metadata describing a requester to the archive chain.

13. The machine-readable medium of claim 10 wherein the archive chain entry is configured for a retrieval of the archive, the method comprising:
   initiating a retrieval request;
   generating a hash of the initial or replicated copy of the archived data set;
   appending the hash from the previous entry in the archive chain;
   sending the hash to the TSA;
   receiving a certificate from the TSA, the certificate including a TSA Time Stamp token; creating an archive chain entry of type "retrieval" with the TSA Time Stamp token; appending the Time Stamp token and the "retrieval" entry to the archive chain; appending metadata describing a requester to the archive chain;
   appending request parameters to the archive chain; and
   appending the hash of the actual archived data set to the archive chain.

14. A non-transitory machine-readable medium, having encoded thereon program code, wherein, when the program code is executed by a machine, the machine performs automatic verification of an archived data set by performing operations comprising:
   initiating an automatic verification request;
   generating a hash of an initial or replicated copy of the archived data set;
   appending a hash from a previous archive chain entry in an archive chain having a plurality of archive chain entries, wherein each archive chain entry defines an event relating to the archived data set;
   sending the hash to a third-party Time Stamp Authority (TSA);
   receiving information from the third-party TSA, the received information including the generated hash, a time stamp, and a certificate certifying that the third-party TSA is certified;
   determining (a) whether the received time stamp matches a maintained local time, (b) whether the received hash is identical to the hash sent to the third-party TSA, and (c) whether the received certificate is valid;
   if (a) the received time stamp is determined to match the maintained local time, and (b) the received hash is determined to be identical to the hash sent to the third-party TSA, and (c) the received certificate is determined to be valid, then creating an archive chain entry of type "auto verify" with at least a portion of the information received from the third-party TSA; and
   appending at least a portion of the received information and the "auto verify" entry to the archive chain.

15. A non-transitory machine-readable medium, having encoded thereon program code, wherein, when the program code is executed by a machine, the machine performs manual verification of an archived data set by performing operations comprising:
   initiating a manual verification request;
   generating a hash of an initial or replicated copy of the archived data set;
   appending the hash from a previous archive chain entry in an archive chain having a plurality of archive chain entry s, wherein each archive chain entry defines an event relating to the archived data set;
   sending the hash to a third-party Time Stamp Authority (TSA);
   receiving information from the third-party TSA, the received information including the generated hash, a time stamp, and a certificate certifying that the third-party TSA is certified;
   determining (a) whether the received time stamp matches a maintained local time, (b) whether the received hash is identical to the hash sent to the third-party TSA, and (c) whether the received certificate is valid;
   if (a) the received time stamp is determined to match the maintained local time, and (b) the received hash is determined to be identical to the hash sent to the third-party TSA, and (c) the received certificate is determined to be valid, then creating an archive chain entry of type "requested verify" with at least a portion of the received information;
   appending the TSA Time Stamp token and the "requested verify" entry to the archive chain; and
   appending metadata describing a requester to the archive chain.

16. A non-transitory machine-readable medium, having encoded thereon program code, wherein, when the program code is executed by a machine, the machine retrieves an archived data set by performing operations comprising:
   initiating a retrieval request;
   generating a hash of an initial or replicated copy of the archived data set;
   appending the hash from a previous archive chain entry in an archive chain having a plurality of archive chain entry s, wherein each archive chain entry defines an event relating to the archived data set;
   sending the hash to a Time Stamp Authority (TSA);
   receiving information from the third-party TSA, the received information including the generated hash, a time stamp, and a certificate certifying that the third-party TSA is certified;

determining (a) whether the received time stamp sufficiently matches a maintained local time, (b) whether the received hash is identical to the hash sent to the third-party TSA, and (c) whether the received certificate is valid;

if (a) the received time stamp is determined to match the maintained local time, and (b) the received hash is determined to be identical to the hash sent to the third-party TSA, and (c) the received certificate is determined to be valid, then creating an archive chain entry of type "retrieval" with the TSA Time Stamp token;

appending the TSA Time Stamp token and the "retrieval" entry to the archive chain; appending metadata describing a requester to the archive chain;

appending request parameters to the archive chain; and appending the hash of the actual archived data set to the archive chain.

17. A method for creating a chain-of-custody entry for an archived data set, the method comprising:

creating a structure containing an entry type, a first hash of the archived data set, and a second hash of archive metadata;

creating a third hash of the structure;

sending the third hash to a third-party Time Stamp Authority (TSA);

receiving information from the third-party TSA, the received information including the generated hash, a time stamp, and a certificate certifying that the third-party TSA is certified;

determining (a) whether the received time stamp matches a maintained local time, (b) whether the received hash is identical to the hash sent to the third-party TSA, and (c) whether the received certificate is valid; and if (a) the received time stamp is determined to match the maintained local time, and (b) the received hash is determined to be identical to the hash sent to the third-party TSA, and (c) the received certificate is determined to be valid, then creating a chain-of-custody entry by appending at least a portion of the received information to the archived data set, wherein the chain-of custody entry defines an event relating to the archived data set.

18. A method for creating a chain-of-custody entry for an archived data set, the method comprising:

generating a first hash of the archived data set and a second hash of metadata relating to the archived data set;

generating a third hash of the first and second hashes;

sending the third hash to a third-party Time Stamp Authority (TSA);

receiving information from the third-party TSA, the received information including at least the third hash and a time stamp, and, if the third-party TSA is certified, the received information further including a certificate certifying that the third-party TSA is certified;

determining (a) whether the received time stamp sufficiently matches a maintained local time, (b) whether the received third hash is identical to the generated third hash sent to the third-party TSA, and (c) if received, whether the certificate is valid;

if (a) the received time stamp is determined to match the maintained local time, and (b) the received third hash is determined to be identical to the generated third hash sent to the third-party TSA, and (c) if received, the received certificate is determined to be valid, then creating a chain-of-custody entry by appending the third hash, the time stamp and, if received, the certificate, to the archived data set.

* * * * *

UNITED STATES PATENT AND TRADEMARK OFFICE
CERTIFICATE OF CORRECTION

| | | |
|---|---|---|
| PATENT NO. | : 9,122,729 B2 | Page 1 of 1 |
| APPLICATION NO. | : 12/847170 | |
| DATED | : September 1, 2015 | |
| INVENTOR(S) | : Joel Michael Love et al. | |

It is certified that error appears in the above-identified patent and that said Letters Patent is hereby corrected as shown below:

In the claims,

Column 9, line 62, in claim 1, delete "chain-of custody" and insert -- chain-of-custody -- therefor.

Column 10, line 66, in claim 10, after "creating", delete "a".

Column 12, lines 28-29, in claim 15, delete "entry s," and insert -- entry, -- therefor.

Column 12, lines 60-61, in claim 16, delete "entry s," and insert -- entry, -- therefor.

Column 13, lines 1-2, in claim 16, after "stamp", delete "sufficiently".

Column 14, line 7, in claim 17, delete "chain-of custody" and insert -- chain-of-custody -- therefor.

Column 14, lines 20-21, in claim 18, after "stamp", delete "sufficiently".

Signed and Sealed this
Ninth Day of February, 2016

Michelle K. Lee
*Director of the United States Patent and Trademark Office*